Patented Aug. 7, 1951

2,562,893

UNITED STATES PATENT OFFICE 2,562,893

HEXACHLOROENDOMETHYLENEDI-ALKOXYTETRAHYDROINDANES

John W. Dawson, Philadelphia, and Willard J. Croxall, Bryn Athyn, Pa., assignors to Rohm & Haas Company, Philadelphia, Pa., a corporation of Delaware No Drawing. Application June 22, 1949,
Serial No. 100,766

4 Claims. (Cl. 260—611)

This invention concerns 2,3,4,5,6,7-hexachloro-4,7 - endomethylene - 8,8 - dialkoxy - 3a,4,7,7a-tetrahydroindanes and a method for their preparation. These compounds are useful as toxicants in insecticidal compositions.

It has been found that hexachlorocyclopentadiene reacts with an alcohol, ROH, where R is a monovalent hydrocarbon group, in the presence of a strong alkali to form 1,1-dialkoxy-2,3,4,5-tetrachlorocyclopentadiene. We have now discovered that this compound reacts by addition with cyclopentadiene to form 4,5,6,7-tetrachloro-4,7 - endomethylene - 8,8 - dialkoxy - 3a,4,7,7a-tetrahydroindene, which is then chlorinated to the hexachloroendomethylene dialkoxytetrahydroindane.

The group R is preferably a non-tertiary alkyl group of one to eight carbon atoms. Thus, for reaction with hexachlorocyclopentadiene there may be used such alcohols as methyl, ethyl, propyl, isopropyl, butyl, isobutyl, or sec.-butyl, and amyl, hexyl, heptyl, or octyl in their various isomeric forms. The alcohol is generally used in molecular excess and reacted with the hexachlorocyclopentadiene at 0° C. to 60° C. for 2 to 24 hours in the presence of about 2 molar proportions of an alkali hydroxide per mole of hexachlorocyclopentadiene. Excess alkali is then neutralized with acid. The dialkoxy tetrachlorocyclopentadiene is separated as by distillation at low pressure.

This product is reacted with cyclopentadiene. The reaction is conveniently carried out in an inert organic solvent, preferably one boiling at 80° C to 150° C. such as benzene, toluene, xylene, or naphtha. The presence of a polymerization inhibitor is desirable and a material, such as hydroquinone, or naphthol, is used in an amount of 0.01% to 5% of the weight of the reactants. The reaction mixture is stirred and heated at 50° to 150° C. and then separated by distillation or obtained as a residue. This product is a tetrachloroendomethylene-dialkoxytetrahydroindene.

It is reacted with a mole of chlorine, at −20° to 40° C. per mole thereof. This reaction is conveniently carried out by taking up the above product in an inert organic solvent, such as benzene, toluene, carbon tetrachloride, dichloroethane-1,2,chloroform, or the like, and passing chlorine into the solution until about the theoretical amount of chlorine has been absorbed. The product is washed with water and the hexachlorinated derivative recovered either as a residue or as a distillate obtained at low pressure.

Specific procedures for preparing 2,3,4,5,6,7-hexachloro - 4,7 - endomethylene - 8,8 - dialkoxy-3a,4,7,7a - tetrahydroindane are shown in the following illustrative examples. The parts shown are by weight.

Example 1.—(a) Potassium hydroxide in an amount of 123.5 parts (2.2 moles) is dissolved in 256 parts (8 moles) of methanol and the solution added slowly over 3 hours to a well stirred suspension of 272.5 parts (1.0 mol) of hexachlorocyclopentadiene in 126 parts (4.0 moles) of methanol at 5–10° C. After addition is complete, the reaction mixture is allowed to come to room temperature while being stirred over 4 hours. Stirring is continued overnight. The reaction mixture is brought to neutrality by the addition of 12 N hydrochloric acid and filtered. The potassium chloride separated is washed with acetone and the washings added to the filtrate. The liquors are stripped of solvent and distilled in vacuo to give a 90% yield of 1,1-dimethoxy-2,3,4,5-tetrachlorocyclopentadiene, distilling at 79–82° C./0.5 mm. This product has a refractive index, $n_D^{30}$, of 1.5282, and contains 53.88% of chlorine (theory 53.80%).

(b) There are dissolved 264 parts (1 mole) of this compound and 2 parts of di-$\beta$-naphthol in 200 parts of toluene and the mixture is heated to reflux temperature. 66 parts (1.0 mole) of cyclopentadiene are introduced below the surface over 4 hours to the well stirred, refluxing toluene solution. Stirring and heating are continued for 30 minutes. The reaction mixture is stripped of solvent and distilled in vacuo giving a 75% yield of 4,5,6,7-tetrachloro-4,7-endomethylene-8,8-dialkoxy-3a,4,7,7a-tetrahydroindene distilling at 114° C./0.5 mm.

(c) 330 parts (1.0 mole) of the above addition product were dissolved in 1600 parts of carbon tetrachloride and cooled to 5° C. Chlorine was passed in until 70.92 parts (1.0 mole) of gas had been absorbed. The solution was washed with water, with sodium carbonate solution, and again with water, stripped of solvent, and distilled in vacuo giving a 75% yield of 2,3,4,5,6,7 - hexachloro - 4,7 - endomethylene - 8,8 - dimethoxy-3a,4,7,7a-tetrahydroindane, distilling at 143–153° C./1.0 mm. The product obtained had a chlorine content of 53.63% (theory 53.10%).

Example 2.—(a) A solution of 120 parts by weight of potassium hydroxide in 590 parts of butanol is slowly added during the course of four hours to a well stirred suspension of 270 parts of hexachlorocyclopentadiene in 200 parts of butanol maintained below 10° C. When addition is complete, cooling is discontinued and the reaction mixture is allowed to come to room temperature and stirred for 20 hours. The reaction mixture is neutralized with concentrated hydrochloric acid and the potassium chloride formed is filtered off. The desired reaction product is separated by fractional distillation, the fraction obtained at 130°–145° C./1 mm. containing most of the 1,1-dibutoxy-2,3,4,5-tetrachlorocyclopentadiene.

(b) There are dissolved 348 parts of the above product and 2 parts of β-naphthol in 600 parts of toluene. The mixture is heated to refluxing temperature, whereupon 66 parts of cyclopentadiene is slowly introduced below the surface of the hot solution. Addition requires about four hours. Stirring and heating are continued for another four hours and the mixture left standing overnight. The toluene is stripped from the mixture by heating under reduced pressure and 4,5,6,7 - tetrachloro - 4,7 - endomethylene - 8,8-dibutoxy-3a-4,7,7a-tetrahydroindene obtained as a residue.

(c) A solution of 415 parts of the above tetrahydroindene in 1600 parts of carbon tetrachloride are cooled to 0°–5° C. Chlorine gas is passed in until 71 parts are absorbed. The reaction mixture is washed with water, with sodium carbonate solution, and again with water. It is dried over sodium sulfate and concentrated under reduced pressure to give a material which corresponds closely in composition to 2,3,4,5,6,7-hexachloro-4,7 - endomethylene - 8,8 - dibutoxy - 3a,4,7,7a-tetrahydroindane.

Example 3.—(a) 123.5 parts (2.2 moles) of potassium hydroxide are dissolved in 780 parts (8.0 moles) of n-octanol and the solution added slowly over 3 hours to a well stirred suspension of 272.5 parts (1.0 mole) of hexachlorocyclopentadiene in 260 parts (2.7 moles) of n-octanol at 5° C. The temperature is allowed to rise gradually to 40° C. Stirring is continued overnight at room temperature. Reaction mixture is brought to neutrality with 12N hydrochloric acid and filtered. A solid is extracted with 200 parts of methanol and is discarded. The extract is combined with the filtrate, washed to neutrality, and stripped of solvent. It is then distilled in vacuo. The fraction distilling at 183° C./1.3 mm. is 1,1-dioctoxy-2,3,4,5-tetrachlorocyclopentadiene. It contains 30.35% compared with a calculated value of 30.8% of chlorine.

(b) There are dissolved 460 parts (1 mole) of the above product and 2 parts of β-naphthol in 800 parts of toluene and the mixture is heated to reflux with stirring. Thereinto 66 parts (1.0 mole) of cyclopentadiene are introduced below the surface over an hour. Heating and stirring are continued for 6 hours. The reaction mixture was filtered, washed to neutrality and concentrated in vacuo. The product obtained contained by analysis 27.3% of $Cl_2$ (calculated 27.75%) and was 4,5,6,7-tetrachloro-4,7 - endomethylene - 8,8-dioctoxy-3a,4,7,7a-tetrahydroindene.

(c) There are dissolved 510 parts (1.0 mole) of the product obtained in 3 (b) in 1600 parts of carbon tetrachloride. The mixture is cooled to 0° C. Chlorine is passed in until 70.92 parts (1.0 mole) have been absorbed. After standing at room temperature for 3 hours, the reaction mixture is washed with water, with sodium carbonate solution, and again with water, and concentrated in vacuo. The analysis corresponds approximately to that of 2,3,4,5,6,7-hexachloro-4,7-endomethylene-8,8-dioctoxy-3a,4,7,7a-tetrahydroindane.

The hexachloroendomethylene dialkoxy tetrahydroindanes are exceedingly toxic to insects but do not appear to have the toxicity to warm-blooded animals which is found in the case of most highly chlorinated toxicants. They also seem to avoid the disadvantage of storage in fatty tissue of animals.

They are potent agents in fly sprays when compounded with a knockdown agent. A spray solution was made from 0.25% of butoxyethoxyethyl thiocyanate and 1.5% of 2,3,4,5,6,7-hexachloro-4,7 - endomethylene - 8,8 - dimethoxy - 3a,4,7,7a-tetrahydroindane in deodorized kerosene. This solution was tested by the Peet-Grady method. A knockdown of 98% was obtained and a +58 kill as compared with the Official Test Insecticide. The dibutoxy analogue gives a kill of +65, while the dioctoxy analogue gives a kill of +74.

Wettable powders were prepared with 50% of the above compounds, 45% of finely divided inorganic fillers and 5% of a mixture of wetting agents. At 8 lbs. per 100 gallons of aqueous spray a kill of 93% was obtained against the southern army worm. A 5% dust was made with hexachloroendomethylene - dimethoxy - tetrahydroindane. It gave a 93% kill of army worm.

A 2% solution was made in kerosene from each of the final compounds prepared in the examples above. A 100% kill of roaches was obtained in a standard roach test in which 0.6 cc. of solution was sprayed into a jar containing roaches. The O. T. I. kill under the same conditions was 68%. Tests were made with smaller volumes of solution. At 0.5 cc. hexachloroendomethylene-dimethoxy-tetrahydroindane gave a kill of 100% and at 0.4 cc. a kill of 87%. The hexachloroendomethylene-dioctoxytetrahydroindane solution gave a 100% kill at 0.5 cc. and a 68% kill at 0.4 cc.

Thus, the compounds of this invention are useful in insecticidal compositions in conjunction with liquid or solid carriers therefor. They may be used as the sole toxic agent or they may be used in conjunction with insecticidal agents or concentrates or with fungicides.

We claim:
1. As new chemical substances 2,3,4,5,6,7-hexachloro - 4,7 - endomethylene - 8,8 - dialkoxy-3a,4,7,7a-tetrahydroindanes in which the alkoxy group contains not over eight carbon atoms.

2. As a new chemical compound, 2,3,4,5,6,7-hexachloro - 4,7 - endomethylene- 8,8-dimethoxy-3a,4,7,7a-tetrahydroindane.

3. As a new chemical compound, 2,3,4,5,6,7-hexachloro - 4,7 - endomethylene - 8,8-dioctoxy-3a,4,7,7a-tetrahydroindane.

4. As a new chemical compound, 2,3,4,5,6,7-hexachloro - 4,7 - endomethylene-8,8-dibutoxy-3a,4,7,7a-tetrahydroindane.

JOHN W. DAWSON.
WILLARD J. CROXALL.

REFERENCES CITED

The following references are of record in the file of this patent:

"Dow Diamond," vol. 10, No. 4, July 1947, pages 1–3.